(12) United States Patent
Dastidar et al.

(10) Patent No.: US 10,922,226 B1
(45) Date of Patent: Feb. 16, 2021

(54) SCRATCHPAD MEMORY MANAGEMENT IN A COMPUTING SYSTEM

(71) Applicant: Xilinx, Inc., San Jose, CA (US)

(72) Inventors: Jaideep Dastidar, San Jose, CA (US); Chetan Loke, Milpitas, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/208,260

(22) Filed: Dec. 3, 2018

(51) Int. Cl.
*G06F 12/00* (2006.01)
*G06F 12/0804* (2016.01)
*G06F 12/10* (2016.01)
*G06F 12/0891* (2016.01)
*G06F 12/0888* (2016.01)

(52) U.S. Cl.
CPC ...... *G06F 12/0804* (2013.01); *G06F 12/0888* (2013.01); *G06F 12/0891* (2013.01); *G06F 12/10* (2013.01); *G06F 2212/1016* (2013.01); *G06F 2212/621* (2013.01)

(58) Field of Classification Search
None
See application file for complete search history.

(56) References Cited

U.S. PATENT DOCUMENTS

2018/0165214 A1* 6/2018 Farmahini Farahani ..................... G06F 11/3055

* cited by examiner

*Primary Examiner* — Midys Rojas
(74) *Attorney, Agent, or Firm* — Patterson + Sheridan, LLP (57) ABSTRACT

An example computing system includes a memory, a peripheral device configured to send a page request for accessing the memory, the page request indicating whether the page request is for regular memory or scratchpad memory, and a processor having a memory management unit (MMU). The MMU is configured to receive the page request and prevent memory pages from being marked dirty in response to the page request indicating scratchpad memory.

20 Claims, 8 Drawing Sheets

SCRATCHPAD MEMORY MANAGEMENT IN A COMPUTING SYSTEM

TECHNICAL FIELD

Examples of the present disclosure generally relate to electronic circuits and, in particular, to scratchpad memory management in a computing system.

BACKGROUND

There is a trend in the usage of peripheral devices in modern data centers where the peripheral devices are increasingly taking on more of the compute and data throughput burden while simultaneously reducing the burden on their server/host counterparts. This trend is particularly pertinent to networking, storage, and machine learning applications, where a peripheral device can not only accelerate and outperform the server/host in performing the same task, but also free up the server/host to work on other applications better suited to the central processing unit (CPU). As a result of this trend, the entire system achieves higher performance while efficiently consuming the available compute, network, and storage resources available to the peripheral devices and their server/host counterpart.

A downside to this trend, however, is that the server/host has to perform increasing levels of memory management on behalf of the peripheral devices. Large data sets require large memory resources that advanced accelerator functions typically require. Conventionally, memory management is performed indiscriminately. Access to memory pages by the peripheral device marks the pages dirty and the memory management process swaps in and out the entire memory footprint for the dirty memory pages. However, a significant portion of the memory used by the peripheral device may be temporary in nature and not required to be saved when page swapping is performed. Thus, there exists a need for more efficient memory management in a computing system.

SUMMARY

Techniques for scratchpad memory management in a computing system. In an example, a computing system includes: memory; a peripheral device configured to send a page request for accessing the memory, the page request indicating whether the page request is for regular memory or scratchpad memory; and a processor having a memory management unit (MMU), the MMU configured to receive the page request and prevent memory pages from being marked dirty in response to the page request indicating scratchpad memory.

In another example, a method of accessing memory by a peripheral device in a computing system includes: receiving an address translation request from the peripheral device for accessing a memory; determining whether the address translation request is for regular memory or scratchpad memory; marking none of memory pages accessed by the peripheral device dirty in response to the address translation request being for scratchpad memory; and marking memory pages written to by the peripheral device as dirty in response to the address translation request being for regular memory.

In another example, a non-transitory computer readable medium having stored thereon instructions that when executed by a processor cause the processor to perform a method of accessing memory by a peripheral device in a computing system including: receiving an address translation request from the peripheral device for accessing a memory; determining whether the address translation request is for regular memory or scratchpad memory; marking none of memory pages accessed by the peripheral device dirty in response to the address translation request being for scratchpad memory; and marking memory pages written to by the peripheral device as dirty in response to the address translation request being for regular memory.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for scratchpad memory management in a computing system are described. The techniques identify and manage scratchpad memory distinct from managing regular memory. The techniques involve enhancing the page request interface (PRI) with scratchpad attributes where the scratchpad memory page tables and their associated memory are handled differently from regular memory page tables and their associated memory. This allows for system level performance improvements and resource efficiencies for data center applications running on a host computer, as well as attached devices using PRI with peripheral component interface express (PCIe), cache coherent interconnect for accelerators (CCIX), and GenZ standards.

In particular, the techniques described herein create a scheme where the peripheral device requesting memory indicates which subset of the requested resources are to be used for scratchpad memory. Scratchpad memory is the term used to describe temporary memory space utilized in the course of performing a task, where the contents of the space are not relevant once the task has been completed. Examples of scratchpad memory usage include: Scratchpad memory utilized for compression/decompression or encryption/decryption functions for large data sets within the accelerator as the data transitions from the source of the data to the accelerator in-between and onward to its intended destination; and Scratchpad memory utilized for a machine learning function's intermediate/hidden layer data sets as the function computationally transitions towards the final probabilities.

The techniques use the scratchpad attribute to create scratchpad memory page tables. The data set resident in memory resources mapped in those scratchpad memory page tables is excluded from the swap-in/out sequence when starting/ending tasks from an accelerator or migrating data sets between accelerators. The techniques described herein can be deployed as enhancements to an industry standard (e.g., as part of PCIe, CCIX, and GenZ PRI mechanism). The techniques described herein can be deployed for the memory management of traditional host-attached system memory, as well as memory management of peripheral-attached memory being enabled by standards such as CCIX and GenZ. These and further aspects can be understood with reference to the drawings.

Figure 1:
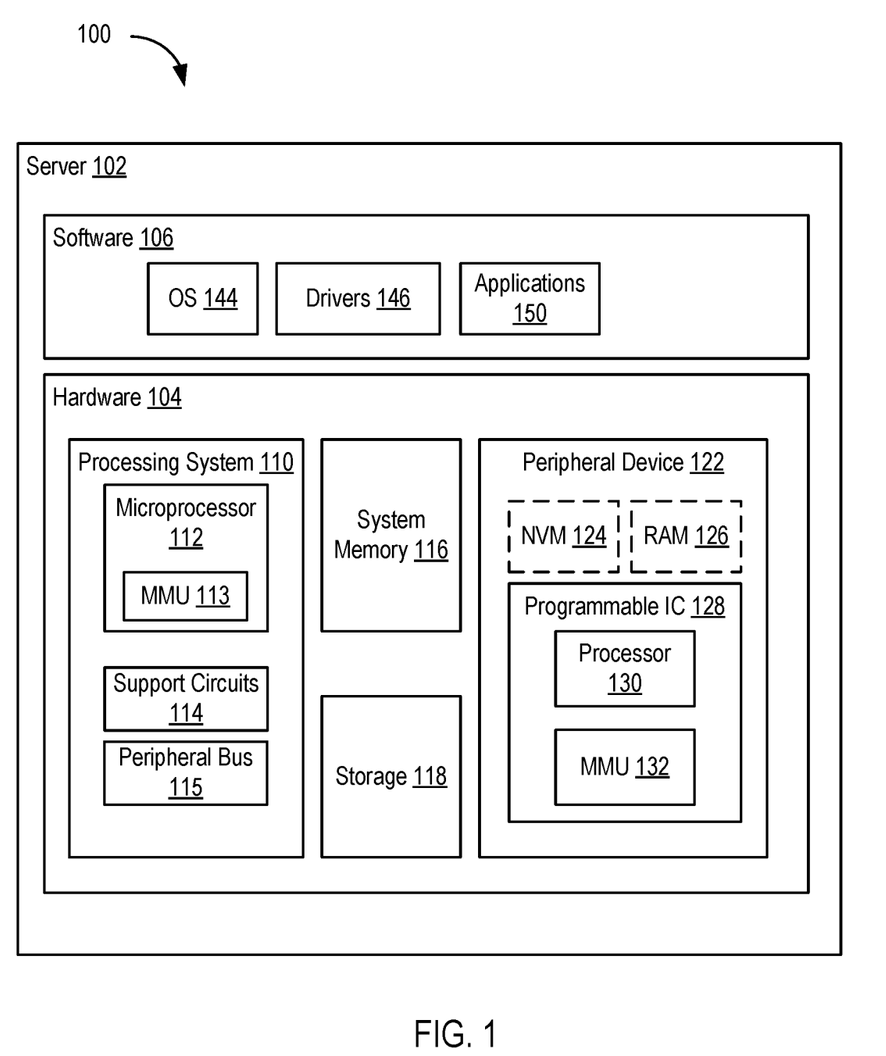
FIG. 1 is a block diagram depicting a computing system according to an example.

FIG. 1 is a block diagram depicting a computing system 100 according to an example. The computing system 100 can be located in a data center or the like. A data center can include a plurality of computing systems configured similarly to the computing system 100. The computing system 100 includes a server computer (server 102). The server 102 includes a hardware platform ("hardware 104") and a software platform ("software 106") executing on the hardware 104. The hardware 104 includes a processing system 110, system memory 116, storage devices ("storage 118"), and a peripheral device 122. The software 106 includes an operating system (OS) 144, driver software (drivers 146), and applications 150.

The processing system 110 includes a microprocessor 112, support circuits 114, and a peripheral bus 115. The microprocessor 112 can be any type of general-purpose central processing unit (CPU), such as an x86-based processor, ARM®-based processor, or the like. The microprocessor 112 can include one or more cores and associated circuitry (e.g., cache memories, interrupt controllers, etc.). The microprocessor 112 further includes one or more memory management units (MMUs) 113. The microprocessor 112 is configured to execute program code that performs one or more operations described herein and which can be stored in the system memory 116 and/or the storage 118. The support circuits 114 include various devices that cooperate with the microprocessor 112 to manage data flow between the microprocessor 112, the system memory 116, the storage 118, the peripheral device 122, or any other peripheral device. For example, the support circuits 114 can include a chipset (e.g., a north bridge, south bridge, platform host controller, etc.), voltage regulators, firmware (e.g., a BIOS), and the like. The support circuits 114 manage data flow between the microprocessor 112 and the peripheral bus 115, to which various peripherals, such as the peripheral device 122, are connected. In some examples, the microprocessor 112 can be a System-in-Package (SiP), System-on-Chip (SoC), or the like, which absorbs all or a substantial portion of the functionality of the chipset (e.g., north bridge, south bridge, etc.). The peripheral bus can implement an expansion bus standard, such as Peripheral Component Interconnect Express (PCIe). In the example, the processing system 110 is shown separate from the peripheral device 122. In other examples discussed further below, the processing system 110 and the peripheral device 122 can be implemented on the same integrated circuit (IC).

The system memory 116 is a device allowing information, such as executable instructions and data, to be stored and retrieved. The system memory 116 can include, for example, one or more random access memory (RAM) modules, such as double-data rate (DDR) dynamic RAM (DRAM). The storage 118 includes local storage devices (e.g., one or more hard disks, flash memory modules, solid state disks, and optical disks) and/or a storage interface that enables the server 102 to communicate with one or more network data storage systems. The hardware 104 can include various other conventional devices and peripherals of a computing system, such as graphics cards, universal serial bus (USB) interfaces, and the like.

The peripheral device 122 includes a programmable IC 128, an optional non-volatile memory 124, and RAM 126. The programmable IC 128 can be a field programmable gate array (FPGA) or the like or an SoC having an FPGA or the like. The NVM 124 can include any type of non-volatile memory, such as flash memory or the like. The RAM 126 can include DDR DRAM or the like. The programmable IC 128 is coupled to the NVM 124 and the RAM 126. The programmable IC 128 is also coupled to the peripheral bus 115 of the processing system 110. While the peripheral device 122 is described as having a programmable IC 128, in other examples, the peripheral device 122 can include other types of devices, such as one or more application specific integrated circuits (ASICs). The programmable IC 128 includes one or more processors 130 and one or more MMUs 132. The processor 130 and MMU 132 function similarly to the microprocessor 112 and MMU 113, respectively.

The OS 144 can be any commodity operating system known in the art, such as such as Linux®, Microsoft Windows®, Mac OS®, or the like. The drivers 146 provide application programming interfaces (APIs) to the peripheral device 122 for command and control thereof. The applications 150 include software executing on the microprocessor 112 that invokes the peripheral device 122 through the drivers 146 to perform some work. The applications 150 can include neural network, video processing, network processing, or the like type applications that offload some functions to the peripheral device 122.

Figure 2:
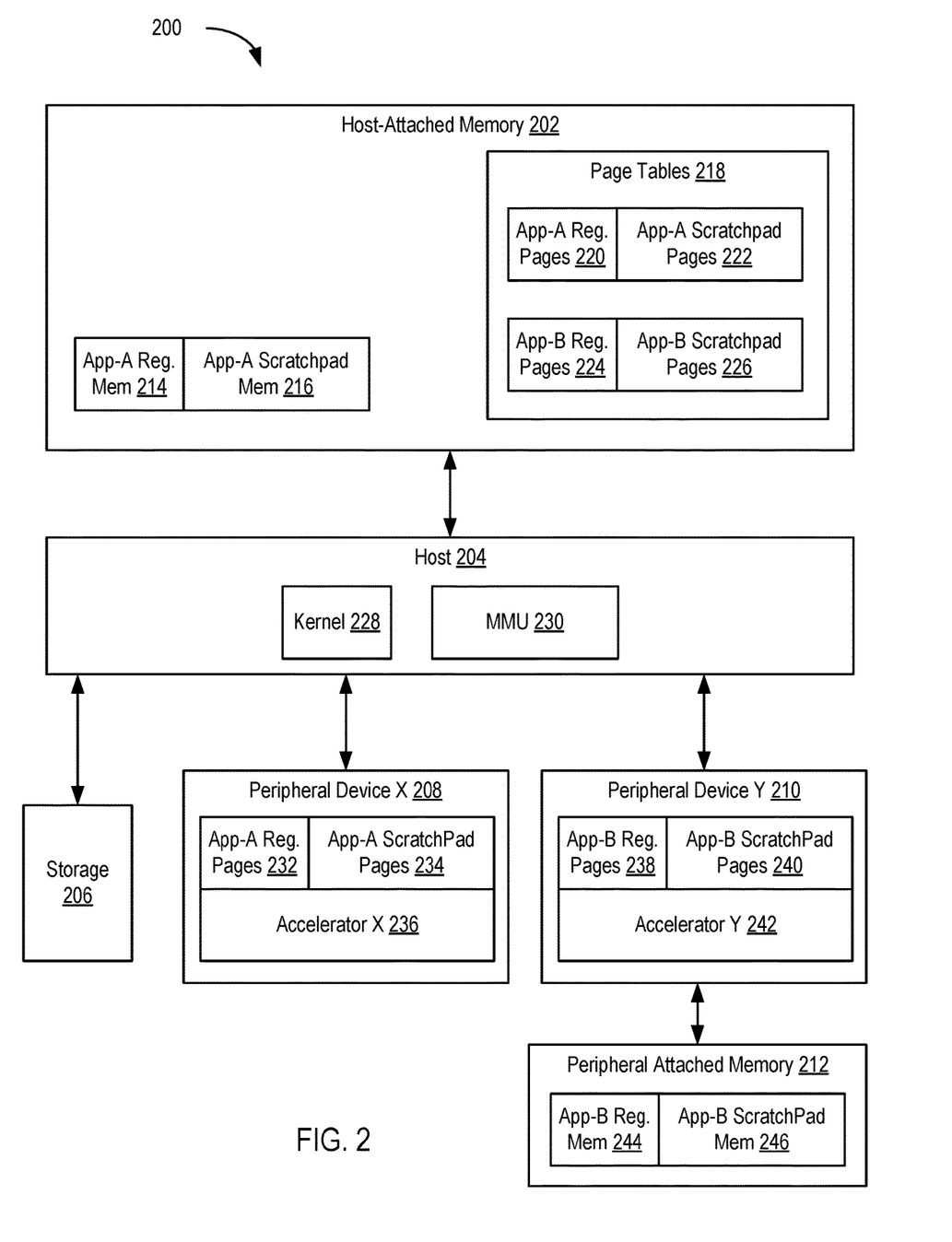
FIG. 2 is a block diagram depicting a logical view of a computer system according to an example.

FIG. 2 is a block diagram depicting a logical view of a computer system 200 according to an example. The computer system 200 can be implemented by the server 102 or similar system. The computer system 200 includes a host 204, host-attached memory 202, storage 206, a peripheral device X 208, a peripheral device Y 210, and peripheral attached memory 212. The host 204 includes a kernel 228 (e.g., part of the OS 144) and an MMU 230 (e.g., the MMU 113 in the microprocessor 112). The host-attached memory 202 is configured to store data for use by host 204, peripheral device X 208, and peripheral device Y 210. The peripheral attached memory 212 is configured to store data for use by host 204 or the peripheral device Y 210. The storage 206 includes persistent storage, such as hard disk storage or the like.

The MMU 230 is a processing element in the host 204 that performs address translations and memory management on behalf of the kernel 228. The kernel 228 is responsible for creating page tables for use by the MMU 230, managing memory allocation/de-allocation of the physical address/memory resources, and managing the swap-in/swap-out of data sets between memory and the storage 206.

Peripheral device X 208 includes an accelerator X 236. The accelerator X 236 represents a component-type that has at least one accelerator function, but does not have direct-attached system memory. Peripheral device X 208 manages page table entries (PTEs) that include memory translation and permission attributes of memory locations accessed by accelerator X 236. For example, the PTEs can be maintained in an input/output translation lookaside buffer (IOTLB) cache of peripheral device X 208. In PCIe and CCIX, the IOTLB cache is also called the Address Translation Cache (ATC). In GenZ, the IOTLB cache is also called the Context Cache. Since peripheral device X 208 does not include direct-attached memory, the final/translated physical address destinations are in host-attached memory 202.

Peripheral device Y 210 includes an accelerator Y 242. The accelerator Y 242 represents a component type that has at least one accelerator function and also access to the peripheral attached memory 212. Peripheral device Y 210 manages PTEs that include memory translation and permission attributes of memory locations accessed by accelerator Y 242. For example, the PTEs can be maintained in the IOTLB cache (or ATC) of the peripheral device Y 210. For peripheral device Y 210, the final/translated physical address destinations are in peripheral attached memory 212.

Kernel 228 creates page tables 218 stored in host-attached memory 202. In the example, there are PTEs for two applications, referred to as app-A and app-B. In addition, PTEs distinguish between regular memory and scratchpad memory. Thus, page tables 218 include PTEs for app-A regular pages 220 and PTEs for app-A scratchpad pages 222. Page tables 218 also include PTEs for app-B regular pages 224 and app-B scratchpad pages 226.

In the example, app-A is performed by peripheral device X 208 and app-B is performed by peripheral device Y 210. Peripheral device X 208 caches PTEs for app-A regular pages 232 and app-A scratchpad pages 234. The memory used by app-A is located in host-attached memory 202, namely, app-A regular memory 214 and app-A scratchpad memory 216. Peripheral device Y 210 caches PTEs for app-B regular pages 238 and app-B scratchpad pages 240. The memory used by app-B is located in peripheral attached memory 212, namely, app-B regular memory 244 and app-B scratchpad memory 246.

Figure 3:
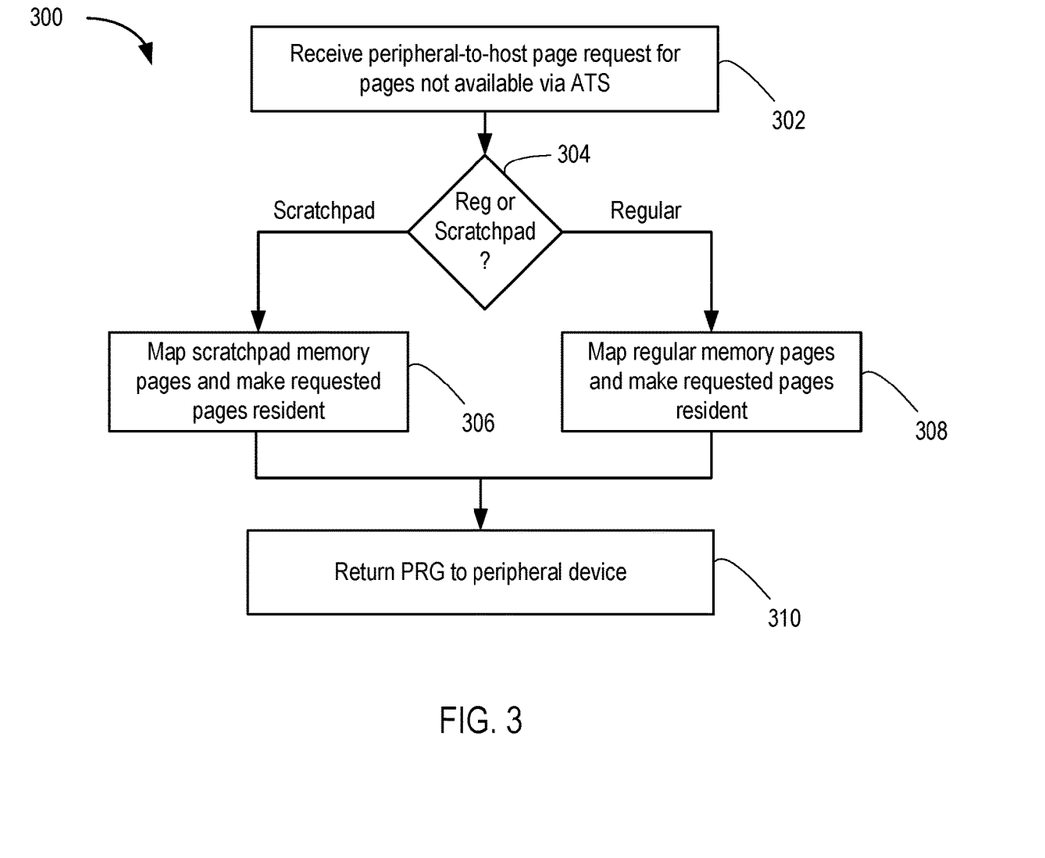
FIG. 3 is a flow diagram depicting a method of swapping in pages from storage according to an example.

FIG. 3 is a flow diagram depicting a method 300 of swapping in pages from storage according to an example. The method 300 begins at step 302, where the host 204 receives a page request from a peripheral for pages not available via address translation services (ATS). That is, the requested pages are not resident in memory (e.g., a page fault occurs). At step 304, the kernel 228 determines from the page request whether the request is for regular memory or scratchpad memory. If scratchpad memory, the method 300 proceeds to step 306. If for regular memory, the method 300 proceeds to step 308. At step 306, the kernel 228 maps scratchpad memory pages and makes the pages resident in memory (e.g., loads the pages from storage). At step 308, the kernel 228 maps regular pages and makes the pages resident in memory (e.g., loads the pages from storage). The method 300 proceeds to step 310, where the kernel 228 returns a page request grant (PRG) to the peripheral device.

In the example of FIG. 2, the accelerator X 236 issues page requests for memory on behalf of app-A (either for regular memory or scratchpad memory). The accelerator X 236 sets the type of memory using a flag in the PRI. The accelerator Y 242 issues page requests for memory on behalf of app-B (either for regular memory or scratchpad memory). The accelerator Y 242 sets the type of memory using a flag in the PRI. The MMU 230 services the page request. In the case where the requested pages are not available, MMU 230 triggers a page fault. The kernel 228 handles the page fault and maps memory pages into page tables 218 depending on the type of memory (regular or scratchpad). If the request is for regular memory, the kernel 228 sets flag(s) in the PTEs indicating regular memory. If the request is for scratchpad memory, the kernel 228 sets flag(s) in the PTEs indicating scratchpad memory. The kernel 228 then loads the requested pages from the storage 206 into memory. For requests from accelerator X 236, the kernel 228 loads pages into host-attached memory 202 (e.g., either app-A regular memory 214 or app-A scratchpad memory 216 depending on the requested memory type). For request from accelerator Y 242, the kernel 228 loads pages into peripheral attached memory 212 (e.g., either app-B regular memory 244 or app-B scratchpad memory 246 depending on the requested memory type). The MMU 230 returns a PRG informing the peripheral device 208 or the peripheral device 210 that the memory resources have been mapped.

Figure 4:
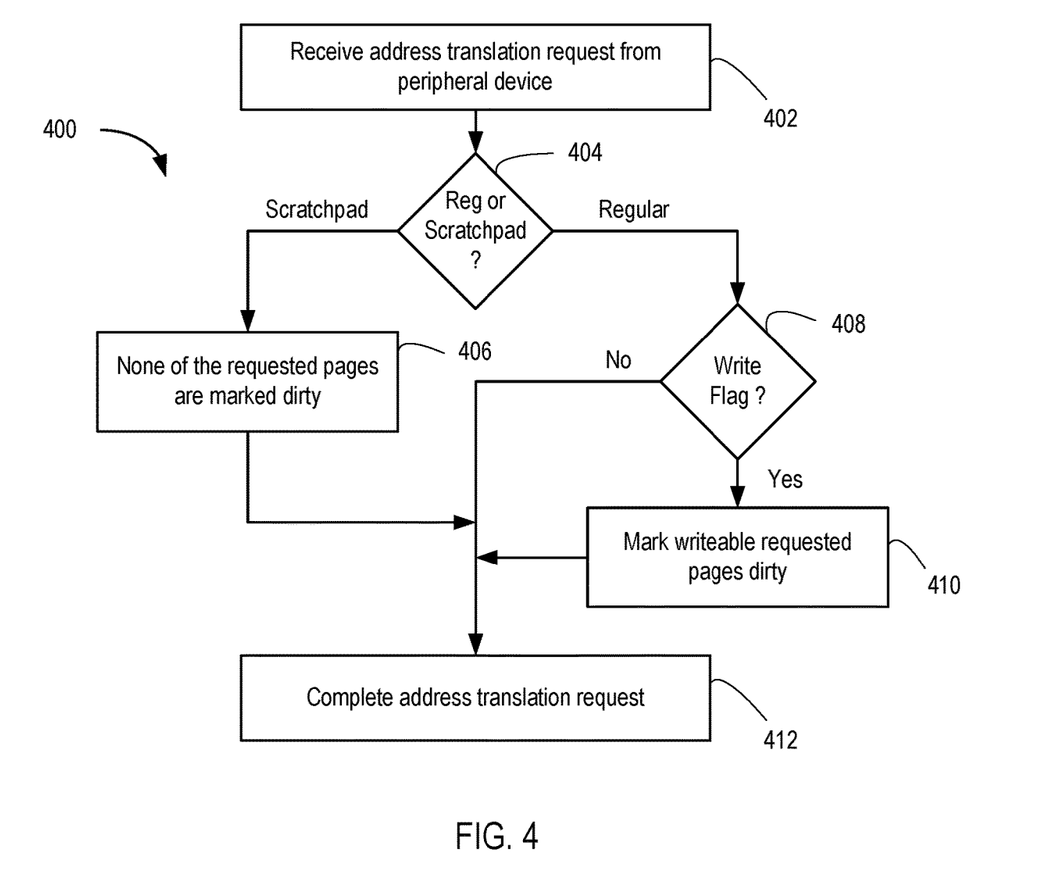
FIG. 4 is a flow diagram depicting a method of handling an address translation request from a peripheral device according to an example.

FIG. 4 is a flow diagram depicting a method 400 of handling an address translation request from a peripheral device according to an example. The method 400 begins at step 402, where the MMU 230 receives an address translation request from a peripheral device. At step 404, the MMU 230 determines from the request if the request is for regular memory or scratchpad memory. If for scratchpad memory, the method 400 proceeds to step 406. If for regular memory, the method 400 proceeds to step 408. At step 406, the MMU 230 does not mark any of the requested pages as dirty. At step 408, the MMU 230 determines whether the write flag is set. If not, the method 400 proceeds to step 412. If so, the method 400 proceeds to step 410. At step 410, the MMU 230 marks the writeable requested pages dirty. At step 412, the MMU 230 completes the address translation request.

In the example of FIG. 2, the peripheral device X 208 makes address translations for app-A memory regions 214 and 216, the returned translations for which are cached. The peripheral device Y 210 makes address translations for app-B memory regions 244 and 246, the returned translations for which are cached. When peripheral device X 208 accesses app-A scratchpad memory 216, the MMU 230 does not mark the pages dirty regardless of whether the access is a write or a read. Likewise, when peripheral device Y 210 accesses app-B scratchpad memory 246, the MMU 230 does not mark the pages dirty regardless of whether the access is a write or a read. The MMU 230 functions normally for requests to regular memory (e.g., marking pages dirty for write requests).

Figure 5:
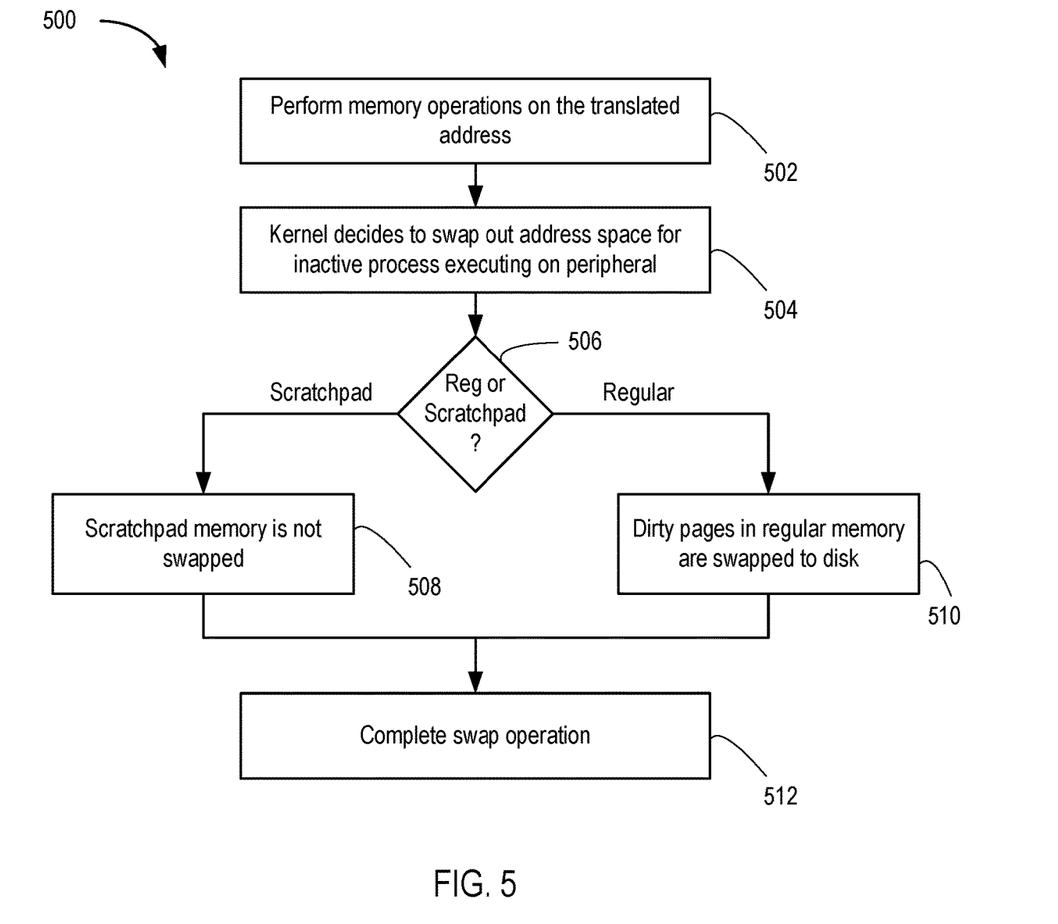
FIG. 5 is a flow diagram depicting a method of performing memory operations according to an example.

FIG. 5 is a flow diagram depicting a method 500 of performing memory operations according to an example. The method 500 begins at step 502, where a peripheral reads or writes to memory using translated addresses. At step 504, the kernel 228 determines that an address space for an inactive process executing on a peripheral needs to be swapped out to storage. At step 506, the kernel 228 determines whether the memory to be swapped out is scratchpad memory or regular memory. If scratchpad memory, the method 500 proceeds to step 508. If regular memory, the method 500 proceeds to step 510. At step 508, the kernel 228 does not swap scratchpad memory to the storage. At step 510, the kernel 228 swaps dirty pages in regular memory to storage. At step 512, the kernel 228 completes the swap operation.

In the example of FIG. 2, the kernel 228 can determine that app-A is inactive. In such case, the kernel 228 swaps out app-A regular memory 214 to storage, since the app-A regular pages 220 are marked as regular memory. The kernel 228 does not swap out app-A scratchpad memory 216, since the app-A scratchpad pages 222 are marked as scratchpad memory. In another example, the kernel 228 can determine that app-B is inactive. In such case, the kernel 228 swaps out app-B regular memory 244 to storage, since the app-B regular pages 224 are marked as regular memory. The kernel 228 does not swap out app-B scratchpad memory 246, since the app-B scratchpad pages 226 are marked as scratchpad memory.

Figure 6:
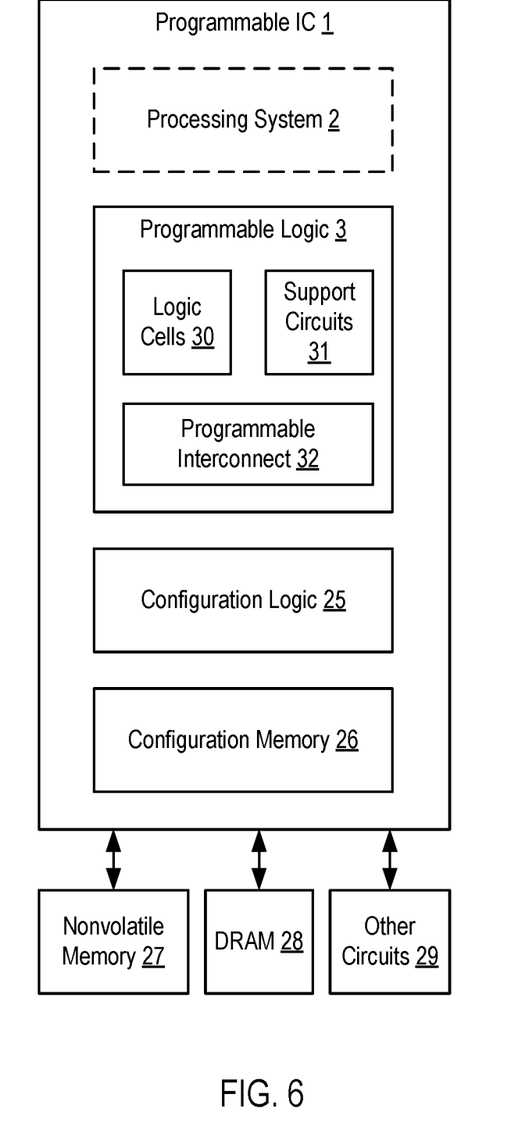
FIG. 6 is a block diagram depicting a programmable IC according to an example.

FIG. 6 is a block diagram depicting a programmable IC 1 according to an example. The programmable IC 1 includes programmable logic 3, configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like. It should be understood that the techniques described herein can be implemented using a single IC (e.g., a programmable IC), an SoC (e.g., as shown in FIG. 5 and described below), or in a multi-chip system, where processors, memories, and programmable ICs are separate devices. In all cases, communication among the hardware components into the programmable IC (or programmable logic of an SoC) connect into the shell circuit, as described above.

Figure 7:
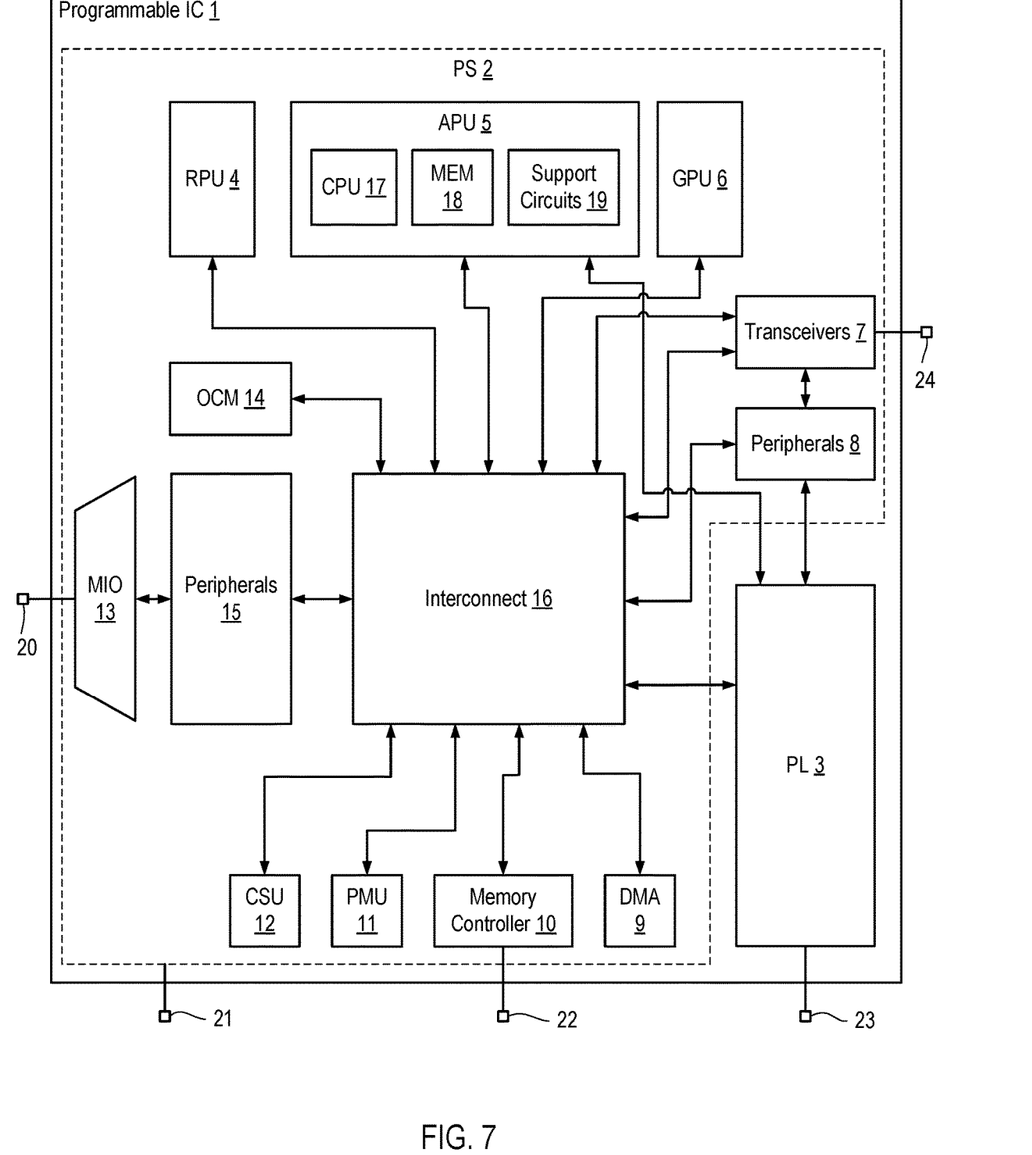
FIG. 7 is a block diagram depicting a System-on-Chip (SoC) implementation of the programmable IC of FIG. 6 according to an example.

FIG. 7 is a block diagram depicting a System-on-Chip (SoC) implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed 10 (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

In the example of FIG. 6, the programmable IC 1 can be used in the peripheral device 122 and can function as described above. An accelerator circuit can be programmed in the PL 3 and function as described above. In another example, the functionality of the hardware 104 described above can be implemented using the PS 2, rather than through hardware of a computing system. In such case, the software 106 executes on the PS 2 and functions as described above.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose IO (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, MGTs, and the like.

Figure 8:
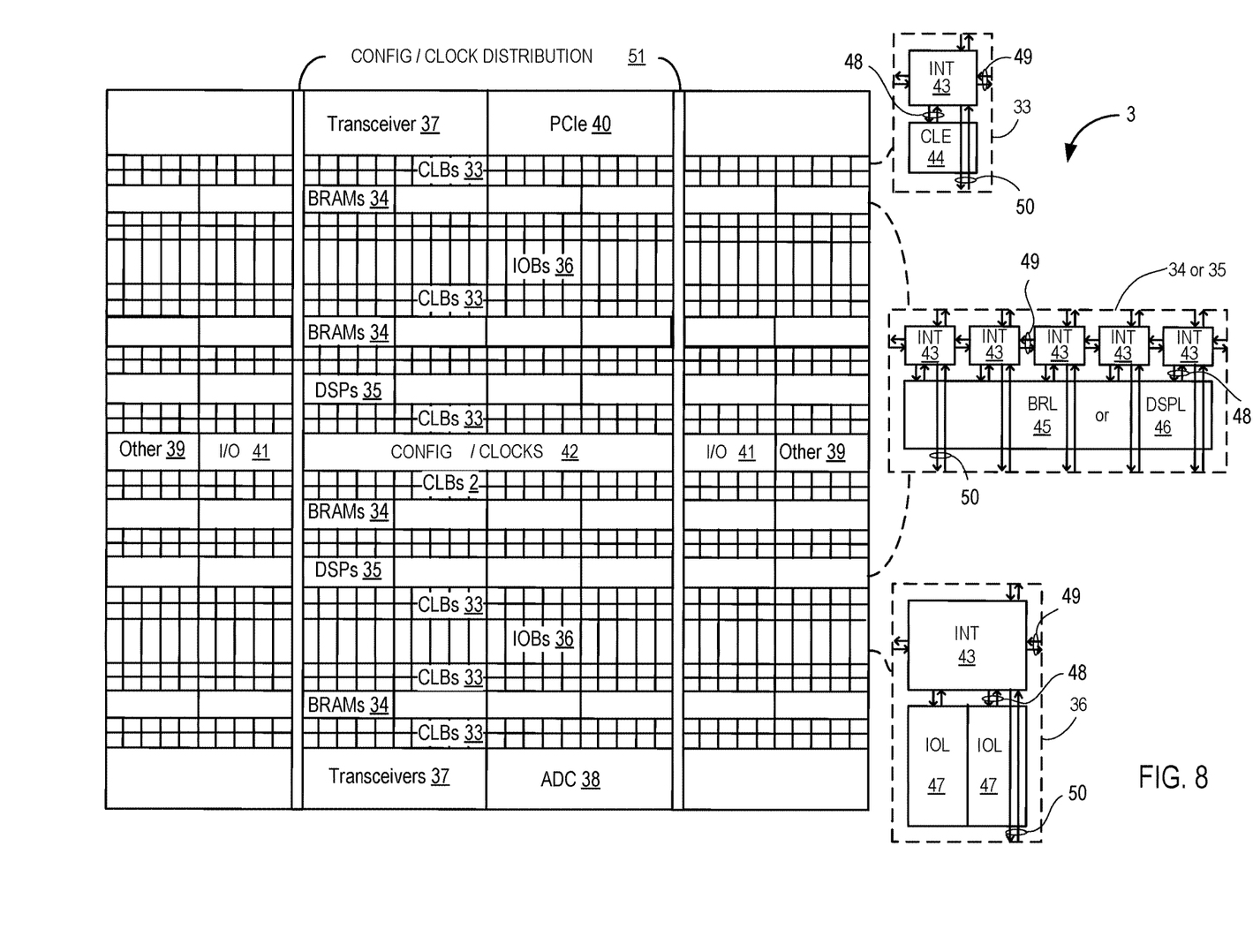
FIG. 8 illustrates a field programmable gate array (FPGA) implementation of the programmable IC of FIG. 6 according to an example.

FIG. 8 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 6. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 6) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A computing system, comprising:
   a memory including regular memory and scratchpad memory;
   a peripheral device configured to send a page request for accessing the memory, the page request indicating whether the page request is for the regular memory or the scratchpad memory; and
   a processor having a memory management unit (MMU), the MMU configured to:
   receive the page request from the peripheral device;
   determine whether the request is for scratchpad memory; and
   in response to a determination that it is, prevent any of the requested pages from being marked as dirty.

2. The computing system of claim 1, further comprising:
   a host, the host including the processor and a host-attached memory, the host-attached memory including at least a portion of the memory.

3. The computing system of claim 2, wherein the page request is for accessing the host-attached memory.

4. The computing system of claim 2,
   wherein the peripheral device further includes a peripheral-attached memory, the peripheral-attached memory including at least a portion of the memory.

5. The computing system of claim 4, wherein the page request is for accessing the peripheral-attached memory.

6. The computing system of claim 1, further comprising:
   storage; and
   a kernel executing on the processor, the kernel executable by the processor to swap in memory pages from the storage and mark the swapped in memory pages as being either for regular memory or for scratchpad memory.

7. The computing system of claim 1, further comprising:
   storage; and
   a kernel executing on the processor, the kernel executable by the processor to prevent swapping out of memory pages to the storage that are marked as scratchpad memory.

8. A method of accessing a memory, comprising:
   receiving an address translation request from a peripheral device for accessing a memory of a computing system, the memory including regular memory and scratchpad memory;
   determining whether the address translation request is for regular memory or scratchpad memory;
   marking none of memory pages accessed by the peripheral device dirty in response to a determination that the address translation request is for scratchpad memory; and
   marking memory pages written to by the peripheral device as dirty in response to a determination that the address translation request is for regular memory.

9. The method of claim 8, wherein the computing system includes a host having a processor and a host-attached memory, the host-attached memory including at least a portion of the memory.

10. The method of claim 9, wherein the address translation request is for accessing the host-attached memory.

11. The method of claim 9, wherein the computing system includes a peripheral-attached memory coupled to the peripheral, the peripheral-attached memory including at least a portion of the memory.

12. The method of claim 11, wherein the address translation request is for accessing the peripheral-attached memory.

13. The method of claim 9, wherein the computing system further includes storage, and a kernel executing on the processor, the kernel executable by the processor to swap in memory pages from the storage and mark the swapped in memory pages as being either for regular memory or for scratchpad memory.

14. The method of claim 9, wherein the computing system further includes storage, and a kernel executing on the processor, the kernel executable by the processor to prevent swapping out of memory pages to the storage that are marked as scratchpad memory.

15. A non-transitory computer readable medium having stored thereon instructions that when executed by a processor cause the processor to perform a method of accessing memory by a peripheral device in a computing system, comprising:
   receiving an address translation request from a peripheral device for accessing a memory of a computing system, the memory including regular memory and scratchpad memory;
   determining whether the address translation request is for the regular memory or the scratchpad memory;
   marking none of memory pages accessed by the peripheral device dirty in response to a determination that the address translation request is for scratchpad memory; and
   marking memory pages written to by the peripheral device as dirty in response to a determination that the address translation request is for regular memory.

16. The non-transitory computer readable medium of claim 15, wherein the computing system includes a host, the host including a processor and a host-attached memory, the host-attached memory including at least a portion of the memory.

17. The non-transitory computer readable medium of claim 16, wherein the host includes storage, and a kernel executing on the processor, the kernel executable by the processor to swap in memory pages from the storage and mark the swapped in memory pages as either for regular memory or for scratchpad memory.

18. The non-transitory computer readable medium of claim 16, wherein the address translation request is for accessing the host-attached memory.

19. The non-transitory computer readable medium of claim 15,
   wherein the peripheral device further includes a peripheral-attached memory, the peripheral-attached memory including at least a portion of the memory, and
   wherein the address translation request is for accessing the peripheral-attached memory.

20. The non-transitory computer readable medium of claim 16, wherein the host includes storage, and a kernel executing on the processor, the kernel executable by the processor to prevent swapping out of memory pages to the storage that are marked as scratchpad memory.

* * * * *